United States Patent [19]

Turney

[11] 4,257,443

[45] Mar. 24, 1981

[54] CHECK VALVE

[75] Inventor: Larry R. Turney, Denton, Tex.

[73] Assignee: Victor Equipment Company, Denton, Tex.

[21] Appl. No.: 970,002

[22] Filed: Dec. 15, 1978

[51] Int. Cl.³ ............................................. F16K 15/06
[52] U.S. Cl. ................... 137/269.5; 137/454.2; 137/543.19; 137/541
[58] Field of Search .................. 137/269.5, 541, 540, 137/543.13, 543.19, 454.2

[56] References Cited

U.S. PATENT DOCUMENTS

| 2,564,023 | 8/1951 | Miller | 137/533.17 |
| 3,001,546 | 9/1961 | Salisbury | 137/541 |
| 3,294,116 | 12/1966 | Tremeau | 137/541 |
| 3,590,851 | 7/1971 | Bogossian | 137/541 X |
| 3,930,521 | 1/1976 | Zahid | 137/541 X |
| 4,129,145 | 12/1978 | Wynn | 137/541 |
| 4,176,681 | 12/1979 | Mackal | 137/541 X |

FOREIGN PATENT DOCUMENTS 410201  5/1934  United Kingdom ................ 137/269.5

Primary Examiner—Alan Cohan
Attorney, Agent, or Firm—Wofford, Fails & Zobal

[57] ABSTRACT

A poppet located in the opening of an annular seat member for use in a body for forming a check valve. The poppet has a resilient seal for engaging a seat formed in the seat member for forming a seal therebetween and which also prevents removal of the poppet from the opening of the seat member. A spring normally urges the poppet in a direction to urge the seal against the seat. The poppet has ribs slidably located in slots formed in the seat member to prevent rotation of the poppet to minimize spring failure. The poppet and seat assembly can be located in the body in either direction to allow the check valve to be used for different purposes. Safety stops are provided in the body for the poppet to prevent shearing of the seal in the event of use in excessive pressure conditions.

8 Claims, 9 Drawing Figures

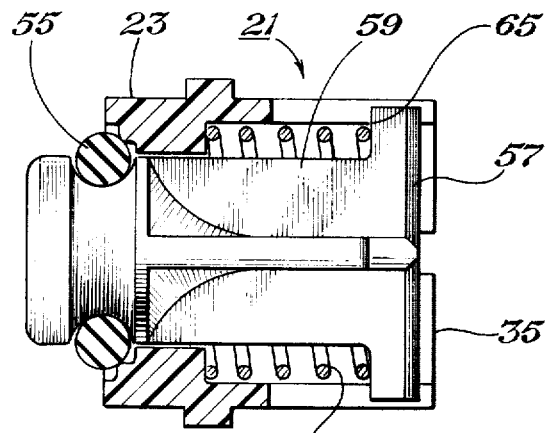
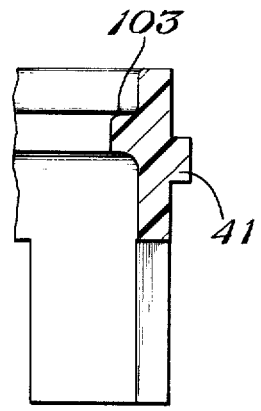
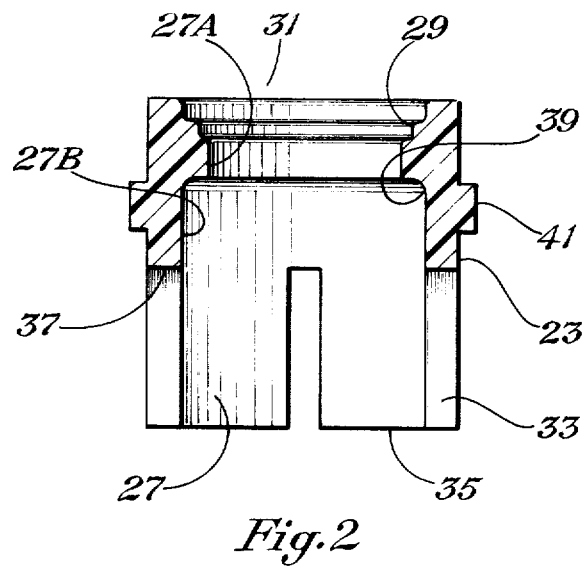
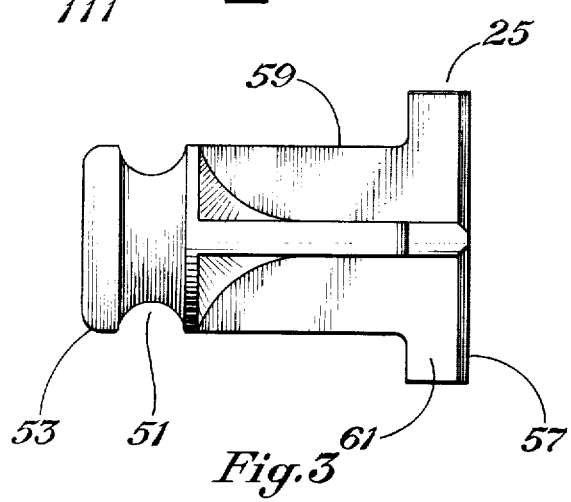
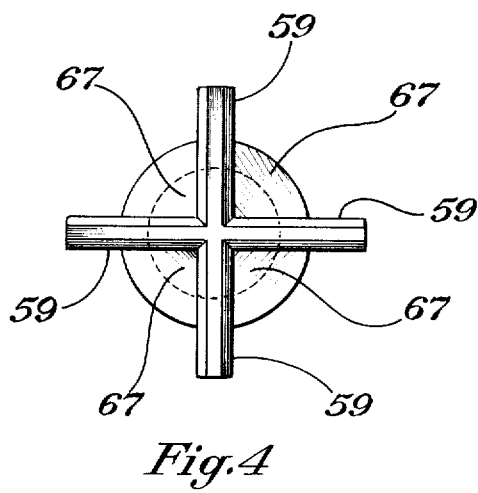

CHECK VALVE

BACKGROUND OF THE INVENTION

1. Field of the Invention

This invention relates to a new and simplified check valve.

2. Description of the Prior Art

Prior known check valves employing poppets are single purpose check valves and comprise a body in which is located a poppet for engaging a seat which is a part of the body.

SUMMARY OF THE INVENTION

It is an object of the present invention to provide a poppet and seat member for use in the opening of a body for forming a check valve.

It is a further object of the present invention to provide a poppet and seat member which may be reversibly located in the opening of the body to allow the valve to be used for different purposes without change of component parts.

In one aspect, the seat member has an opening in which is located the poppet. The poppet has a seal for engaging a seat formed in the seat member for forming a seal therebetween and which also prevents removal of the poppet from the opening of the seat member.

In a further aspect, a spring is provided for normally urging the poppet in a direction to urge the seal against the seat. The poppet has ribs slidably located in slots formed in the seat member to prevent rotation of the poppet to minimize spring failure. The ribs also form passages for gas flow through the opening of the seat member. Safety stops are provided in the body for the poppet to prevent shearing of the seal in the event of use in excessive pressure conditions.

BRIEF DESCRIPTION OF THE DRAWINGS

FIG. 1 is a cross-section of the poppet and seat assembly of the present invention with the poppet located in the opening of a seat member.

FIG. 2 is a cross-sectional view of the seat member of FIG. 1 with the poppet removed.

FIG. 3 is a side view of the poppet of FIG. 1.

FIG. 4 is a rear view of the poppet of FIG. 3.

FIG. 7 is a partial side elevational view, partly in section showing a preferred seal for low differential pressure applications.

FIG. 8 is a partial cross-sectional view of the seat member of FIG. 7.

FIG. 9 is a partial side view of the poppet of FIG. 7.

DETAILED DESCRIPTION OF THE INVENTION

Figure 5:
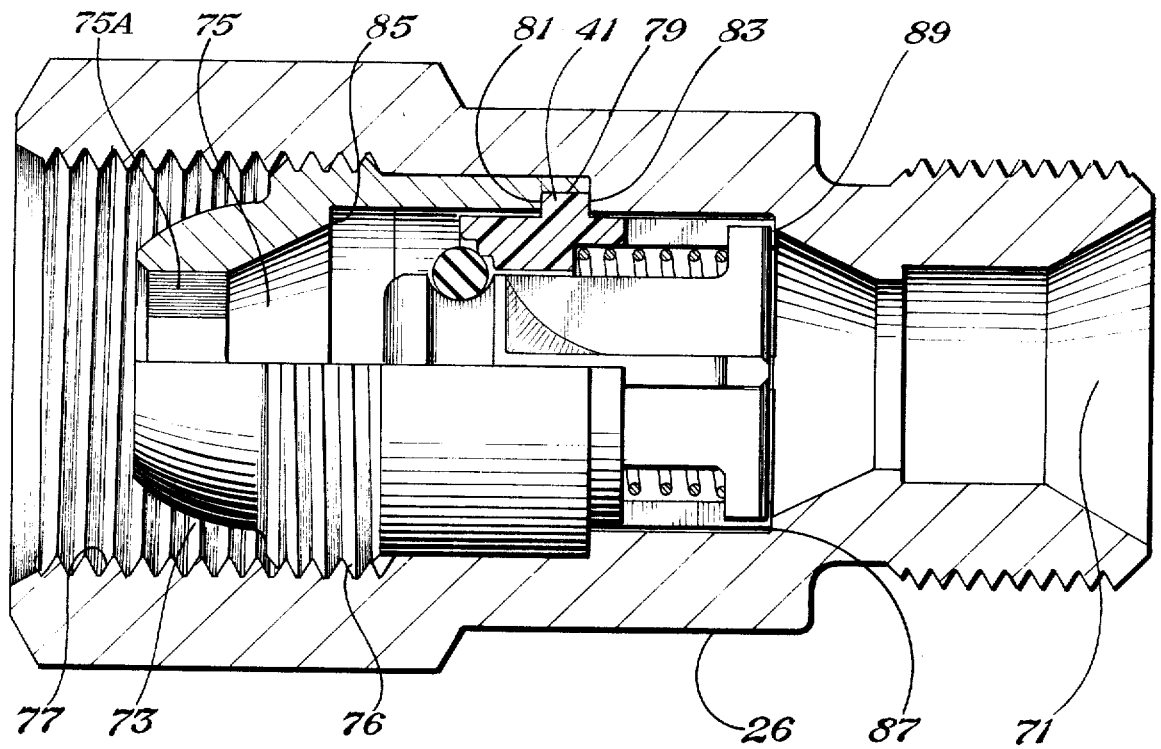
FIG. 5 illustrates the poppet and seat assembly of FIG. 1 installed in one direction in a valve body to form a torch check valve.
Figure 6:
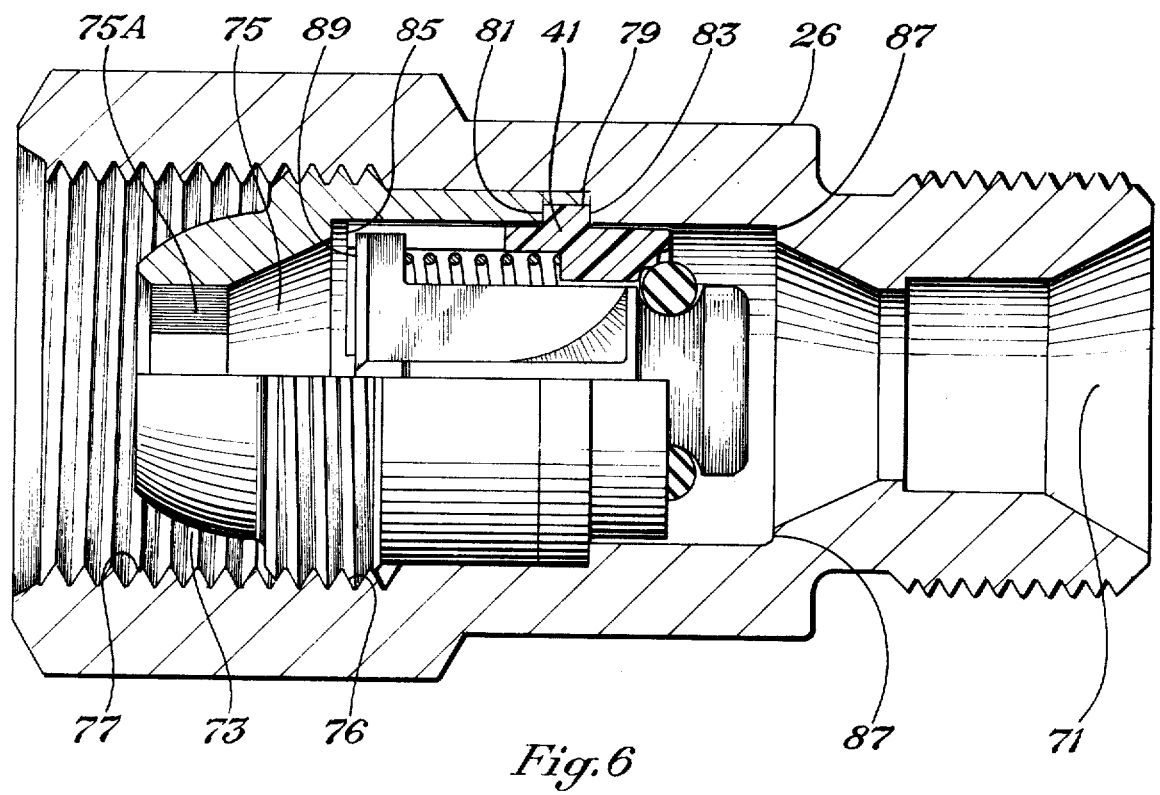
FIG. 6 illustrates the poppet and seat assembly of FIG. 1 installed in an opposite direction in a valve body to form a regulator check valve.

Referring now to FIGS. 1-4, reference numeral 21 identifies a poppet and seat assembly formed by an annular seat member 23 with a poppet 25 located therein. The assembly 21 may be located in one direction in a valve body 26, as shown in FIG. 5, to form a check valve for a torch or in an opposite direction in the valve body, as shown in FIG. 6, to form a check valve for a regulator.

The seat member 23 has an opening 27 extending therethrough with an annular seat 29 formed at one end 31 and four slots 33 formed through the wall and which extend from the opposite end 35 toward end 31. The slots 33 are formed 90° apart and terminate in surfaces 37 located about midway of the length of the seat member 23. From the seat 29 to end 35, the opening 27 is defined by two openings 27A and 27B which have different diameters. As can be seen, the diameter of opening 27A is smaller than that of opening 27B. A shoulder 39 is formed where opening 27A enlarges to opening 27B. An annular rim 41 is formed around the exterior of the seat member 23.

The poppet 25 has an annular groove 51 formed at its nose end 53 in which is located a resilient seal 55 which may be formed of synthetic rubber. From the groove 51 to the opposite end 57, the poppet is defined by four ribs 59 which extend radially outward from its axis and which are located 90° apart. At the end 57, the ribs 59 have extensions 61 which act as guides as will be described subsequently. From the extensions 61 to the groove 51, the diameter of the poppet is the same and is less than that of the opening 27A whereby the poppet (without the seal 55) may be inserted into the opening 27 of the seat member 23 from its end 35 with the four rib extensions 61 slidably located in the four slots 33, respectively. In the insertion process, the poppet 25 is positioned such that the groove 51 extends beyond the end 31 of the seat member 23 whereby the seal 55 may be expanded and slipped in place in the groove 51. An annular compression spring 63 is located around the poppet within the opening 27 with one end bearing against the shoulder 39 and an opposite end bearing against surfaces 65 of the four rib extensions 61. The spring 63 normally urges the poppet 21 in a direction (to the right in FIG. 1) to urge the seal 55 against the seat 29 to form a seal therebetween. The seal 55 also prevents removal of the poppet from the opening 27 through the end 35 of the seat member 23. This reduces parts and adds to the simplicity of the check valve. The poppet 25 may be moved axially against the bias of the spring 53 (to the left in FIG. 1) to an open position where the seal 55 extends beyond the seat 29. The outermost portions of surfaces 65 of rib extensions 61 are adapted to engage the surfaces 37 of the seat member which form the terminating ends of the slots 33 to prevent the poppet 21 from being moved beyond a predetermined open position.

The rib extensions 61 in the slots 33 serve as guides to prevent rotation of the poppet to minimize spring failure. For example, if the poppet were allowed to rotate, rapid cycling could cause the spring 63 to unwind causing premature spring failure. The legs of the seat member 23 which form the slots 33 also serve the purpose of guiding and containing the spring 63.

The ribs 59 define four passages 67 for the gas flow through the annular orifice of the seat 29. This also allows the flow to go through the inside of the spring 63 preventing and deformation of the spring or flow restriction which is possible if the flow must pass through the coils of the spring. The ribs 59 also straighten the flow and reduce turbulence which can reduce flow and cause poppet vibrations. The slots 33 are wide enough such that they allow a slight amount of lateral movement of the rib extensions 61 in the slots. While this is normally no problem because of the laminar flow, in theory, turbulent flow can cause increases in the sizes of the passages on one side of the opening 27 and a corresponding decrease in the size of the passages on the other side of the opening 27 to cause flutter, or vibration. The passages formed by the ribs 59 can be made varied in sizes to cause a pressure imbalance on the poppet to cause the poppet to drag on one side of the seat member to prevent such vibrations.

Referring to FIGS. 5 and 6, the valve body 26 has an opening 71 formed therethrough. A retaining member 73 having an opening 75 formed therethrough is provided for insertion into the opening 71 for holding the poppet and seat assembly 21 in the opening 71. The retaining member 73 may be defined as a removable part of the body 26. It may be press fitted or otherwise held in place. As illustrated, it has male threads 76 to allow it to be threaded into female threads 77 formed in one end of the opening 71. It also has an enlarged opening 79 and shoulder 81 for engaging the rim 41 and holding the rim against a shoulder 83 formed in the body 26 thereby holding the assembly 21 in the opening 71 of the body. The annular shell 80 defining the opening 79 is of the desired length to prevent crushing of the plastic rim 41.

The assembly 21 can be held in the opening 71 of the body 21 as shown in FIG. 5 to form a check valve for a torch or in an opposite direction as shown in FIG. 6 to form a check valve for a regulator, such as an oxygen regulator. This has advantages since it requires only a single type of assembly 21 and body 26 to be stocked to form either type of check valve. In the check valve of FIG. 5, flow is from right to left with the resilient seal 55 blocking flow in the reverse direction by engaging the seat 29. In the embodiment of FIG. 6, flow is from left to right.

As shown in FIGS. 5 and 6, the retaining member 73 and the body 26 have opposite facing shoulders 85 and 87 which serve as safety stops for the poppet 25, depending in which direction the assembly 21 is located in the opening 71 of the body 26. In this respect, as shown in FIGS. 1, 5 and 6, the end 57 of the poppet 25 extends nearly to the end 35 of the seat member 23 when the seal 55 engages the seat 29 under normal pressure conditions. Referring to the check valve of FIG. 5, if the fluid pressure on the right of the resilient seal 55 becomes excessive, the poppet 25 will be moved to the right until the edges 89 of the rib extensions 61 engage the shoulders 87 and prevent the seal 55 from being sheared due to the excessive pressure. For example, check valves have been designed to operate at up to 200 pounds per square inch gauge (psig), but the seal is in danger of being damaged at pressures above about 400 psig. The shoulders 85 serve the same purpose in the check valve of FIG. 6.

In one embodiment, the seat member 23 and poppet 25 may be formed of plastic. The poppet and seat assembly 21 may have an exterior diameter of about ⅜ inch and a length of about ⅜ inch. It may be readily slipped into a torch body or immediately down stream of a regulator as well as used in other types of check valves. The illustrated retaining member 73 has a hex aperture 75A which allows it to be unthreaded or threaded with an allen wrench or the like. If desired a press fitted retaining member 73 can be employed.

In the embodiment described hereinbefore the resilient seal was an O-ring. The O-ring works well as long as there is a differential pressure of more than three or four psi (pounds per square inch) to effect good seating or there is unflawed surfaces such that lesser pressure will effect sealing seating of the O-ring against the annular seat 29.

A preferred embodiment that employs a seal that works well even at low differential pressures is illustrated in FIGS. 7-9. Referring to FIG. 7, the seal comprises an annular lip 101 that sealingly seats against an annular seat 103. As shown in FIG. 8, the seat has a flat seating surface of appreciable extent such that the lips can form a seal even at low pressure. The seal also includes a supporting ring 105 carrying the lip and conformably fitting in the groove 107. As shown in FIG. 9, the groove can be trapezoidal in cross-section, or any desired shape, as long as it is adapted to conformably receive and sealingly fit the back of the supporting ring 105. As illustrated, the seal also includes a bonnet 109 sealingly carrying the annular lip 101. As can be seen in FIG. 8, the bonnet 109 also sealingly carries the supporting ring 105. In fact all three, the bonnet 109, supporting ring 105 and annular lip 101, are integrally formed together so as to be fit over and encompass the end 111 of the poppet 25. This structure prevents any leakage between the back of the supporting ring 105 and the groove 107.

The embodiment of FIGS. 7-9 operates the same as the embodiment described hereinbefore.

From the foregoing, it can be seen that this invention effects the objects set forth hereinbefore. Specifically, the economical light weight assembly is reversible and widely useful. It fills a long standing need.

Although the invention has been described with a certain degree of particularity, it is understood that the present disclosure is made only by way of example and that numerous changes in the details of construction and the combination and arrangement of parts may be resorted to with out departing from the spirit and the scope of the invention.

I claim:

1. An assembly for use as a check valve comprising;
   a seat member having an opening extending therethrough,
   a poppet member located in said opening for axial movement therein,
   said seat member having an annular seat at a first end surrounding said poppet member,
   an annular seal in surrounding engagement with said poppet member and adapted to engage said annular seat,
   spring means engaging portions of said seat member and said poppet member for normally urging said poppet member in a first direction to urge said seal against said seat to form a seal therebetween,
   the engagement of said seal with said seat preventing removal of said poppet member from said opening of said seat member through a second end opposite said first end,
   said poppet member being adapted to be moved in a second direction opposite said first direction against the bias of said spring means to an open position to allow fluid to flow through said opening,
   said poppet member having stop means adapted to engage stop means of said seat member when said poppet member is moved in said second direction to a given position to prevent removal of said poppet member from said opening of said seat member through said first end thereof;

slot means formed through wall structure of said seat member along a portion of the length thereof, and said poppet member having rib means extending along a portion of the length thereof; said rib means being slidably located in said slot means to prevent rotation of said poppet member and allowing axial movement thereof.

2. An assembly for use as a check valve comprising:

a seat member having a first passageway extending longitudinally therethrough, having an annular seat of first lateral dimensions at the first end and having at its opposite and second end a second passageway of second lateral dimensions larger than said first lateral dimensions for receiving a poppet member inserted through said second end;

slot means formed through wall structure of said seat member along a portion of the length thereof;

a poppet member located in said first and second passageways for axial movement therein; said poppet member having a small first end adapted to pass through said first and second passageways and protruding through said first passageway beyond said first end of said seat member; said poppet member having a second end larger than said first passageway such that said poppet member can be inserted only into said second passageway and removed only through said second passageway when a seal is released from its first end;

an annular seal sealingly encompassing and in surrounding engagement with said first end of said poppet member and adapted to sealingly engage said annular seat for preventing backflow; said seal being larger than said first passageway so as to prevent said poppet member from moving out of said seat member; said seal being adapted to slip easily over and engage said first end of said poppet member in assembly and to be disengaged from said first end for disassembly and removal of said poppet member through said second end of said seat member;

spring means engaging portions of said seat member and said poppet member for normally urging said poppet member in a first direction to urge said seal against said seat to form a seal therebetween;

the engagement of said seal with said seat preventing removal of said poppet member from said opening of said seat member through a second end opposite said first end;

said poppet member being adapted to be moved in a second direction opposite said first direction against the bias of said spring means to an open position to allow fluid to flow through said opening;

said poppet member having stop means adapted to engage stop means of said seat member when said poppet member is moved in said second direction to a given position to prevent removal of said poppet member from said opening of said seat member through said first end thereof;

said poppet member having rib means extending along a portion of the length thereof and slidably located in said slot means to prevent rotation of said poppet member and to allow axial movement thereof.

3. An assembly for use as a check valve comprising:

a seat member having a first passageway extending longitudinally therethrough, having an annular seat of first lateral dimensions at the first end and having at its opposite and second end a second passageway of second lateral dimensions larger than said first lateral dimensions for receiving a poppet member inserted through said second end;

said seat member having a plurality of angularly spaced slots formed through its wall structure and which extend from its second end toward its first end to a plane transverse to the axis of said opening;

a poppet member located in said first and second passageways for axial movement therein; said poppet member having a small first end adapted to pass through said first and second passageways and protruding through said first passageway beyond said first end of said seat member; said poppet member having a second end larger than said first passageway such that said poppet member can be inserted only into said second passageway and removed only through said second passageway when a seal is released from it first end;

said poppet member having a plurality of angularly spaced ribs extending radially outwardly from the axis of said poppet member, said ribs extending along the length of said poppet member from about said seal to a second end opposite said first end, the space between said ribs defining flow passages for fluid flow through said opening when said poppet member is located at said open position, each of said ribs at said second end of said poppet member having a radially outward extending portion slidably located in one of said slots to prevent rotation of said poppet member and to allow axial movement of said support member.

said radially outward extending portions of said ribs being adapted to engage the wall structure of said seat member which defines said transverse plane when said poppet member is moved to said given position to prevent removal of said poppet member from said opening of said seat member through said first end thereof;

an annular seal sealingly encompassing and in surrounding engagement with said first end of said poppet member and adapted to sealingly engage said annular seat for preventing backflow; said seal being larger than said first passageway so as to prevent said poppet member from moving out of said seat member; said seal being adapted to slip easily over and engage said first end of said poppet member in assembly and to be disengaged from said first end for disassembly and removal of said poppet member through said second end of said seat member;

spring means engaging portions of said seat member and said poppet member for normally urging said poppet member in a first direction to urge said seal against said seat to form a seal therebetween;

the engagement of said seal with said seat preventing removal of said poppet member from said opening of said seat member through a second end opposite said first end;

said poppet member being adapted to be moved in a second direction opposite said first direction against the bias of said spring means to an open position to allow fluid to flow through said opening, such that said poppet member has stop means adapted to engage stop means of said seat member when said poppet member is moved in said second direction to a given position to prevent removal of said poppet member from said opening of said seat member through said first end thereof.

4. The assembly of claim 3 wherein:

said opening extending through said seat member is defined by a first opening which extends from about said seat to a position intermediate said seat and said transverse plane and a second opening which extends from said intermediate position to said second end of said seat member, the cross-sectional size of said first opening being smaller than that of said second opening, said seat member having shoulders joining said first and second openings at said intermediate position, the cross-sectional size of said poppet member from said seal to said radially outward extending portions being smaller than that of said first opening, said spring means being located around said poppet member and having one end seated against said shoulder means and an opposite end seated against said radially outward extending portions of said ribs.

5. A check valve comprising:

a body having an opening extending therethrough, an assembly adapted to be reversibly located in said opening of said body whereby said check valve may be used for different purposes, said assembly comprising:

a seat member having an opening extending therethrough, a poppet member located in said opening of said seat member for axial movement therein, said seat member having an annular seat at a first end surrounding said poppet member, an annular seat in surrounding engagement with said poppet member and adapted to engage said annular seat, spring means engaging portions of said seat member and said poppet member for normally urging said poppet member in a first direction to urge said seal against said seat to form a seal therebetween, the engagement of said seal with said seat preventing removal of said poppet member from said opening of said seat member through a second end opposite said first end, said poppet member being adapted to be moved in a second direction opposite said first direction against the bias of said spring means to an open position to allow fluid to flow through said opening of said seat member, said poppet member having stop means adapted to engage stop means of said seat member when said poppet member is moved in said second direction to a given position to prevent removal of said poppet member from said opening of said seat member through said first end thereof, slot means formed through wall structure of said seat member along a portion of the length thereof, and said poppet member having rib means extending along a portion of the length thereof; said rib means being slidably located in said slot means to prevent rotation of said poppet member and allowing axial movement thereof; and removable means for holding said assembly in said opening of said body with the axis of said assembly in alignment with the axis of said opening of said body, said removable means being adapted to hold said assembly in said opening of said body with said first end of said seat member facing in either direction to allow fluid flow in either direction.

6. A check valve comprising:

a body having an opening extending therethrough, an assembly adapted to be reversibly located in said opening of said body whereby said check valve may be used for different purposes, said assembly comprising:

a seat member having a first passageway extending longitudinally therethrough, having an annular seat of first lateral dimensions at the first end and having at its opposite and second end a second passageway of second lateral dimensions larger than said first lateral dimensions for receiving a poppet member inserted through said second end;

slot means formed through wall structure of said seat member along a portion of the length thereof;

a poppet member located in said first and second passageways for axial movement therein; said poppet member having a small first end adapted to pass through said first and second passageways and protruding through said first passageway beyond said first end of said seat member; said poppet member having a second end larger than said first passageway such that said poppet member can be inserted only into said second passageway and removed only through said second passageway when a seal is released from its first end;

an annular seal sealingly encompassing and in surrounding engagement with said first end of said poppet member and adapted to sealingly engage said annular seat for preventing backflow; said seal being larger than said first passageway so as to prevent said poppet member from moving out of said seat member; said seal being adapted to slip easily over and engage said first end of said poppet member in assembly and to be disengaged from said first end for disassembly and removal of said poppet member through said second end of said seat member;

spring means engaging portions of said seat member and said poppet member for normally urging said poppet member in a first direction to urge said seal against said seat to form a seal therebetween, the engagement of said seal with seat preventing removal of said poppet member from said opening of said seat member through a second end opposite said first end, said poppet member being adapted to be moved in a second direction opposite said first direction against the bias of said spring means to an open position to allow fluid to flow through said opening, said poppet member having stop means adapted to engage stop means of said seat member when said poppet member is moved in said second direction to a given position to prevent removal of said poppet member from said opening of said seat member through said first end thereof;

said poppet member having rib means extending along a portion of the length thereof and slidably located in said slot means to prevent rotation of said poppet member and to allow axial movement thereof; and removable means for holding said assembly in said opening of said body with the axis of said assembly in alignment with the axis of said opening of said body, said removable means being adapted to hold said assembly in said opening of said body with said first end of said seat member facing in either direction to allow fluid flow in either direction.

7. A check valve comprising:

a body having an opening extending therethrough, an assembly adapted to be reversibly located in said opening of said body whereby said check valve may be used for different purposes, said assembly comprising:

- a seat member having a first passageway extending longitudinally therethrough, having an annular seat of first lateral dimensions at the first end and having at its opposite and second end a second passageway of second lateral dimensions larger than said first lateral dimensions for receiving a poppet member inserted through said second end;
- said seat member having a plurality of angularly spaced slots formed through its wall structure and which extend from its second end toward its first end to a plane transverse to the axis of said opening of said seat member;
- a poppet member located in said first and second passageways for axial movement therein; said poppet member having a small first end adapted to pass through said first and second passageways and protruding through said first passageway beyond said first end of said seat member; said poppet member having a second end larger than said first passageway such that said poppet member can be inserted only into said second passageway and removed only through said second passageway when a seal is released from it first end;
- said poppet member having a plurality of angularly spaced ribs extending radially outwardly from the axis of said poppet member,
- said ribs extending along the length of said poppet member from about said seal to a second end opposite said first end,
- the space between said ribs defining flow passages for fluid flow through said opening when said poppet member is located at said open position,
- each of said ribs at said second end of said poppet member having a radially outward extending portion slidably located in one of said slots to prevent rotation of said poppet member and to allow axial movement of said poppet member,
- said radially outward extending portions of said ribs being adapted to engage the wall structure of said seat member which defines said transverse plane when said poppet member is moved to said given position to prevent removal of said poppet member from said opening of said seat member through said first end thereof;
- an annular seat sealingly encompassing and in surrounding engagement with said first end of said poppet member and adapted to sealingly engage said annular seat for preventing backflow; said seal being larger then said first passageway so as to prevent said poppet member from moving out of said seat member; said seal being adapted to slip easily over and engage said first end of said poppet member in assembly and to be disengaged from said first end for disassembly and removal of said poppet member through said second end of said seat member;
- spring means engaging portions of said seat member and said poppet member for normally urging said poppet member in a first direction to urge said seal against said seat to form a seal therebetween;
- the engagement of said seal with said seat preventing removal of said poppet member from said opening of said seat member through a second end opposite said first end;
- said poppet member being adapted to be moved in a second direction opposite said first direction against the bias of said spring means to an open position to allow fluid to flow through said opening,
- such that said poppet member has stop means adapted to engage stop means of said seat member when said poppet member is moved in said second direction to a given position to prevent removal of said poppet member from said opening of said seat member through said first end thereof; and removable means for holding said assembly in said opening of said body with the axis of said assembly in alignment with the axis of said opening of said body, said removable means being adapted to hold said assembly in said opening of said body with said first end of said seat member facing in either direction to allow fluid flow in either direction.

8. The check valve of claim 7 wherein:

said opening extending through said seat member is defined by a first opening which extends from about said seat to a position intermediate said seat and said transverse plane and a second opening which extends from said intermediate position to said second end of said seat member, the cross-sectional size of said first opening being smaller than that of said second opening, said seat member having shoulders joining said first and second openings at said intermediate position, the cross-sectional size of said poppet member from said seal to said radially outward extending portions being smaller than that of said first opening, said spring means being located around said poppet member and having one end seated against said shoulder means and an opposite end seated against said radially outward extending portions of said ribs.

* * * * *